UNITED STATES PATENT OFFICE.

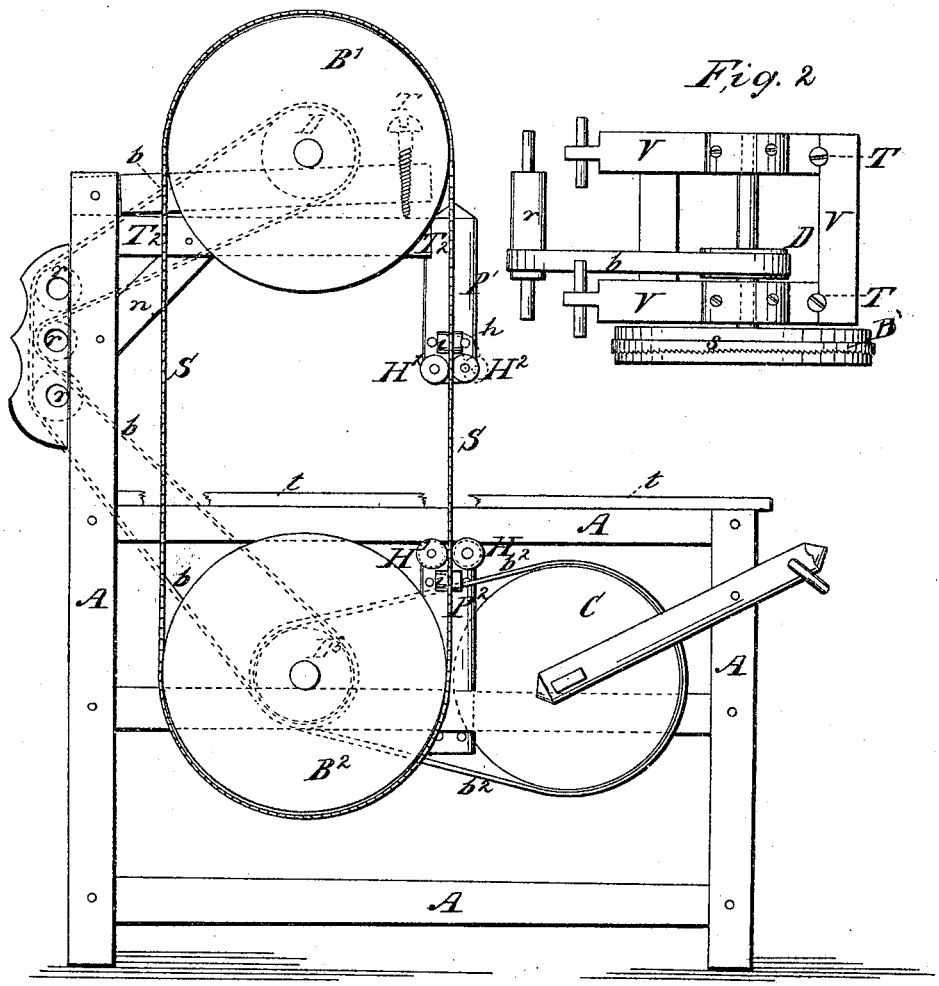

G. L. BAAR, OF INDIANAPOLIS, INDIANA.

IMPROVED SCROLL-SAW.

Specification forming part of Letters Patent No. 33,732, dated November 19, 1861.

*To all whom it may concern:*

Be it known that I, G. L. BAAR, of the city of Indianapolis, in the county of Marion and State of Indiana, have invented a new and useful Improvement in Scroll-Saws; and I do hereby declare that the following is a full and exact description thereof, reference being had to the accompanying drawings, and to the letters of reference thereon.

The nature of my invention consists in an endless belt-saw, which saw is strained to the proper degree of tension by an adjustable pulley, said pulley being the upper one of the two around which the saw passes and by means of which the saw is also driven. Another peculiarity of my saw is that it is held in place by a peculiar adjustment and combination of friction-rollers both below and above that point of the saw where the sawing is done. These things will be more fully described hereinafter.

In this description, where reference is made to the drawings, like letters refer to like parts.

Figure 1 is a front elevation and partly sectional view of my invention; and Fig. 2 is a top view of the adjustable pulley-frame, which sustains the upper pulley, around which the saw passes.

A is a portion of the main frame (which may be made either of wood or iron) that sustains the saw and the various pulleys that drive it; also, the table-top upon which the material slides when it is presented to the saw.

B' is the upper saw-pulley. This pulley may be about twenty inches diameter, made of wood, and its thickness must exceed the width of the saw.

B² is the lower saw-pulley, of similar material and dimensions as of the upper one. While it is fixed and not adjustable, the upper one B' is journaled upon a perpendicularly-vibrating frame, Fig. 2, so that it can be elevated or depressed with ease by means of (temper) thumb-screws.

C is a driving-pulley from which the power to drive the saw-pulleys is communicated.

O is a crank upon the shaft of pulley C, which enables the operator to drive the saw by hand; but when it is driven by steam or other power a pulley must take the place of this crank.

The dotted lines on the large pulleys here are intended to represent the small band-pulleys in the rear and the manner in which the motion is communicated from one wheel or pulley to the others.

$b^2$ is a band, which connects direct with the driving-pulley C and thence passes over pulley D' on the shaft of the lower saw-pulley B². From here the band $b$ passes obliquely upward and around the friction-rollers $r$ $r$, and from these to the pulley D, which is located on the shaft of the upper saw-pulley B'. It will be seen that this novel arrangement possesses a double advantage: first, in carrying the band or belt out of the way of the saw-room, so as to allow much space for handling stuff about the saw, and, secondly, by this both the saw-pulleys are driven by the same belt, which causes their revolutions necessarily to be the same. The advantages of this are too apparent to require anything more than a mere reference.

That limb of the saw S which is in the center of the table $t$ $t$ (some of which being cut away) is the portion of it that does the work of sawing, and the saw-blade runs down at that point. This part of the saw is also held in position by the small friction-rollers H', H², and $h$. The two former exert a lateral protection to the saw, while the latter one $h$ is placed horizontally against the back of the saw, and, being adjustable by a small thumb-screw, the saw can be held so that its teeth will just stand flush with the front ends of the side rollers, and thus guard against any damage being done by the attrition of the teeth against said rollers. These rollers are secured to a head-block P' above and P² below. These head-blocks are divided at the roller ends, and the outer half of each one is hinged to the main block, so as to allow a slight yielding, these adjustable sections being held snug against the saw by the pressure of flat springs on their outside. The rollers $i$ $i$ are at the back of the saw and the joint at $h$ on the upper head-block. These rollers should all be made of metal, as can also the head-blocks that hold them.

Fig. 2, as before stated, is a top view of the adjustable pulley-frame sustaining the top saw-pulley B'. V are the sides and end of this frame. The sides are mortised into the top end of the long vertical frame-piece A and hinged there by simple pins or bolts. The temper-screws T serve to elevate this frame (and the pulleys with it) and have for a fixed base upon which to act the arm $T^2$, said arm being secured by the brace $n$. To suit the convenience of the operator, the frame V may be placed either above or below this braced arm. Loose pulleys may be placed alongside of the driving-pulleys D D' for running the bands off these, and thereby arresting the motion of the saw.

The advantages of an endless saw for scroll-work are great, not the least of which is the continuous movement of the saw in the same direction, thus avoiding the vibrating or shaking of the stuff when it is presented to the saw, and securing thereby a far greater accuracy in the work done.

Having thus fully described my invention and the nature of its operation, what I claim as new, and desire to secure by Letters Patent, is—

An endless saw S, in combination with the two pulleys $D'$ $D^2$, each propelled by the same belt, arranged as described.

G. L. BAAR.

Witnesses:
E. T. BUSSELL,
L. BUSSELL.